United States Patent
Simonis et al.

(12) United States Patent
(10) Patent No.: US 7,311,536 B2
(45) Date of Patent: Dec. 25, 2007

(54) TRANSMISSION DEVICE FOR TRANSMITTING ELECTRICAL SIGNALS BETWEEN A ROTOR AND A STATOR

(75) Inventors: Karl Simonis, Illingen (DE); Rainer Lipfert, Heilbronn (DE); Martin Hasch, Schwieberdingen (DE); Roland Gruener, Tamm (DE); Bernd Binder, Sersheim (DE); Jürgen Suchanek, Güglingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 250 days.

(21) Appl. No.: 10/532,217

(22) PCT Filed: Jun. 29, 2004

(86) PCT No.: PCT/EP2004/007007

§ 371 (c)(1),
(2), (4) Date: Apr. 22, 2005

(87) PCT Pub. No.: WO2005/104150

PCT Pub. Date: Nov. 3, 2005

(65) Prior Publication Data

US 2006/0276057 A1 Dec. 7, 2006

(51) Int. Cl.
*H01R 39/00* (2006.01)

(52) U.S. Cl. .................................................. 439/164
(58) Field of Classification Search ............... 439/164, 439/15; 242/388.1, 388.5, 397, 378
See application file for complete search history.

(56) References Cited

U.S. PATENT DOCUMENTS 5,171,153 A * 12/1992 Kubota et al. ............. 439/15
5,928,018 A * 7/1999 Dumoulin .................. 439/164
6,039,588 A * 3/2000 Osawa ...................... 439/164

FOREIGN PATENT DOCUMENTS

DE 43 29 820 3/1994
DE 197 34 527 2/1998

* cited by examiner

*Primary Examiner*—Alexander Gilman
(74) *Attorney, Agent, or Firm*—Paul Vincent

(57) ABSTRACT

The invention concerns a transmission device for transmitting electrical signals between a rotor and a stator, having an annular space formed by the rotor and the stator, wherein the space receives at least one flat strip cable which extends between the rotor and the stator and can be wound and unwound in the space, and wherein at least one elastically resilient annular band is provided to support the flat strip cable in the space. The invention is characterized in that the annular band can be driven by the rotor and/or the stator via engagement sections provided on the side of the annular band.

8 Claims, 3 Drawing Sheets

TRANSMISSION DEVICE FOR TRANSMITTING ELECTRICAL SIGNALS BETWEEN A ROTOR AND A STATOR

This application is the national stage of PCT/EP2004/007007 filed on Jun. 29, 2004.

BACKGROUND OF THE INVENTION

The invention concerns a transmission device for transmitting electrical signals between a rotor and a stator, having an annular space formed by the rotor and stator, wherein the space receives at least one flat strip cable which extends between the rotor and the stator and which can be wound and unwound in the space, wherein at least one elastically resilient annular band is provided in the space to support the flat strip cable.

A transmission device of this type may be used e.g. in the steering column region of a vehicle, wherein the rotor is disposed on the steering wheel side and the stator is disposed on the chassis side. In modern vehicles, a plurality of functions are actuated via steering wheel switches. The inventive transmission device can transmit the electrical signals triggered by the switches to users or control devices on the chassis side, which do not follow the rotary motion of the steering wheel.

DE 43 29 820 A1 discloses a transmission device wherein the flat strip cables are guided in the space. The flat strip cable may be shortened due to the guidance, thereby still permitting a sufficiently high number of rotations of the rotor. The flat strip cable usually consists of a plurality of parallel conductors which are combined using a base insulation material. Rotation aids in the form of blind cables which are mounted to the rotor and to the stator are provided to prevent the flat strip cable from being clamped or from slacking and thereby folding when the rotor is turned. A transmitting device of this type has proven to be relatively unreliable. Use of blind cables as the rotation aid is relatively demanding, since the blind cables must be wound together with the flat strip cable transmitting the signals when mounting the transmission device. If several flat strip cables are used to transmit a plurality of electrical signals, support of the flat strip cables using the blind cables becomes more and more difficult.

DE 197 34 527 A1 discloses a transmission device of the above-mentioned type, wherein several annular bands are disposed in the space. The annular bands have a predetermined elasticity and are structured to deform under load between the outer periphery of e.g. the inner rotor and the inner periphery of e.g. the outer stator. The annular bands roll on the inner periphery of the rotor or stator during rotation of the rotor. The annular bands thereby load the flat band against the outer or inner periphery. Anti-contacting elements in the form of rollers or balls are used to prevent contact between two neighboring annular bands. The anti-contacting elements also rotate in the rolling direction of the annular bands when the rotor is turned. This conventional arrangement is disadvantageous in that it requires a large number of movable components which are driven by the rotary motion of the rotor, i.e. the annular bands and the anti-contacting elements. Rattling noises cannot be prevented, in particular, due to the anti-contacting elements. Rotation of the rotor is also impaired by the anti-contacting elements which also rotate and are subjected to a certain amount of friction and wear.

It is therefore the underlying purpose of the present invention to provide a transmission device of simple construction which still permits permanent and reliable winding and unwinding of at least one flat strip cable between the rotor and the stator. In particular, at least one elastically resilient annular band should be provided to support the flat strip cable. The transmission device should, however, have a minimum amount of moving components thereby still preventing the annular band from impairing the rotary motion of the rotor or the motion of the flat strip cable in the space.

SUMMARY OF THE INVENTION

This object is achieved with a transmission device of the above-mentioned type in that the annular band can be driven by the rotor and/or by the stator via engagement sections provided on the annular band side. The rotor and/or the stator thereby preferably directly drive the annular band, i.e. without further connecting intermediate movable parts, which leads to secure rolling of the annular band in the space. Undesired motion or slipping and possible consequent impairment of the rotary motion of the rotor is prevented by the annular band drive. Movable intermediate elements which generate undesired noise or cause undesired wear are unnecessary.

The elastic properties of the annular band allow the annular band to completely fill the space in a radial direction and to suitably load the flat strip cable against both the rotor and stator. If the flat strip cable is wound several times on the rotor and/or stator, the annular band can compensate for the varying width of the space. Due to its pretension, the annular band flatly abuts the rotor and the stator. Rattling noises caused by the annular band in the space are eliminated. The annular band may be largely circular in the disassembled state.

In accordance with the invention, either the rotor or the stator may drive the annular band. The annular band is preferably driven by both the rotor and the stator to clearly define its position in the space, which changes when the rotor turns.

In a preferred embodiment of the invention, the engagement sections are formed on the upper and/or lower edge of the annular band in the form of tooth-gap-like recesses which cooperate with complementary tooth-like drive sections of the rotor and/or of the stator to drive the annular band. The engagement sections on the upper and/or lower edge of the annular band facilitate an effective drive of the annular band without influencing the flat strip cable or impairing its motion. The engagement sections and the tooth-gap-like recesses thereby project past the flat strip cable. The tooth-like drive sections of the rotor or of the stator are correspondingly disposed above or below the free longitudinal edge of the flat strip cable.

The drive sections of the rotor and/or of the stator are preferably disposed on the bottom of the space. The drive sections can cooperate with the engagement sections of the annular band without impairing the flat strip cable.

In accordance with the invention, the drive sections may extend in an axial and radial direction such that the free edge of the flat strip cable may be supported on the drive sections. The drive sections on the rotor and/or on the stator consequently serve not only to drive the annular band but also as supports for the respectively free edge of the flat strip cable. The overall friction on the free longitudinal edges of the flat strip cable is thereby reduced since the flat strip cable is only partially supported.

In a further embodiment of the invention, the drive sections have a cuboid main part and an end part which tapers down towards the bottom in a radial direction facing the space. In particular, the tapering end part ensures safe guidance of the flat strip cable in a radial direction such that the flat strip cable is safely supported on the cuboid main part thereby preventing blockage or jamming of the flat strip cable on the drive sections.

In another embodiment of the invention, the annular band may comprise deformation indentations which extend substantially parallel to the axis of rotation of the rotor for caterpillar-like rolling in the space. The deformation indentations may be designed e.g. as grooves or notches. A tooth may extend in the longitudinal direction of each deformation indentation, wherein two neighboring teeth delimit a tooth-gap-like recess of the engagement section.

In a further preferred embodiment of the invention, several annular bands are provided in the space to prevent contact between two neighboring annular bands. Contact between two neighboring annular bands driven in accordance with the invention is reliably prevented. In particular, three or more annular bands may be provided in the space.

The invention also concerns an annular band for an inventive transmission device. An annular band of this type has engagement sections which are formed, in particular, by tooth-gap-like recesses, wherein the annular band may be driven by the rotor and/or by the stator via the engagement sections.

Further advantageous details and designs of the invention can be extracted from the following description which describes and explains the invention in more detail with reference to embodiments shown in the drawing.

DESCRIPTION OF THE PREFERRED EMBODIMENT

Figure 1:
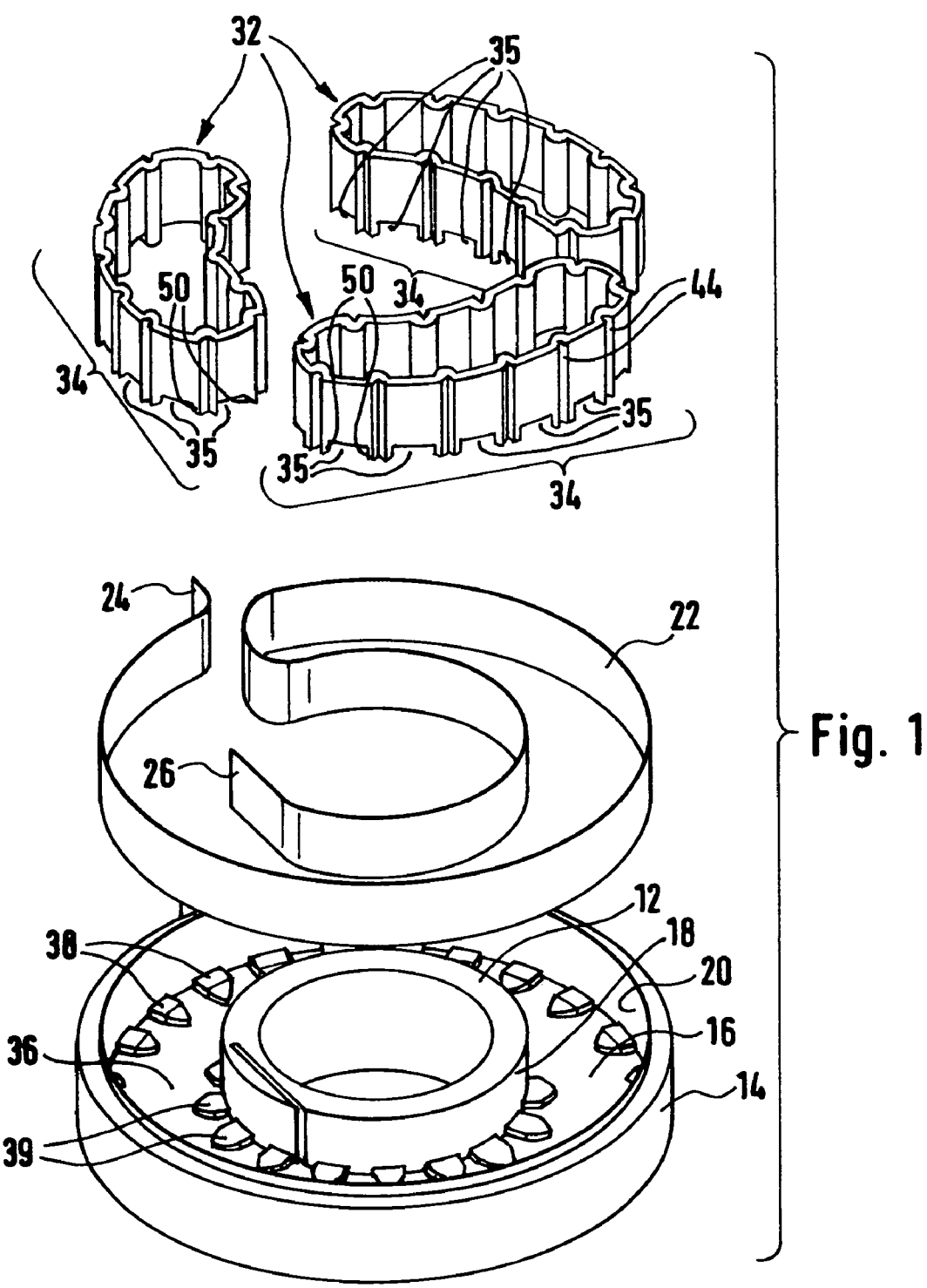
FIG. 1 shows an exploded view of an inventive transmission device.
Figure 2:
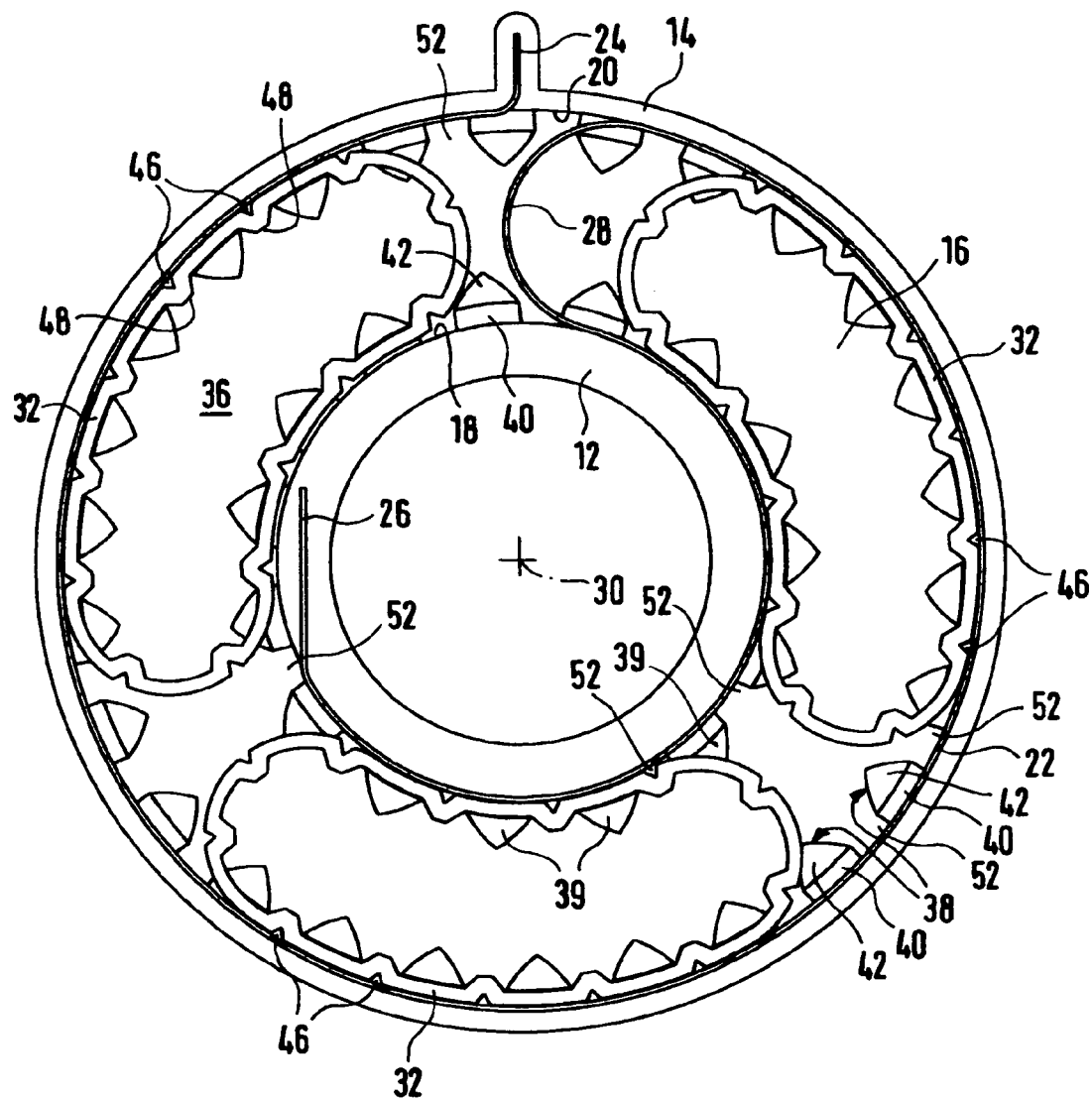
FIG. 2 shows a plan view onto the transmission device of FIG. 1.

FIGS. 1 and 2 show an inventive transmission device 10. The transmission device 10 transmits electrical signals between a rotor 12 and a stator 14. The rotor 12 can thereby be coupled to a steering wheel or a steering shaft of a vehicle. The stator may be disposed on the chassis side and therefore does not follow the rotary motion of the rotor 12. An annular space 16 is provided between the rotor 12 and the stator 14 which is radially delimited by the outer wall 18 of the rotor 12 and the inner wall 20 of the stator 14. The space 16 of the transmission device 10 of FIGS. 1 and 2 is open at the top. The open side of the space 16 can be covered by a cover element (not shown).

A flat strip cable 22 for transmitting electrical signals is disposed between the rotatable rotor 12 and the non-rotatable stator 14. One free end 24 of the flat strip cable 22 is disposed on the stator side and the other free end 26 is disposed on the rotor side.

FIG. 2 shows that the flat strip cable 22 is initially supported, from the free end 24, on the inner wall 20 of the stator 14. Further on, the flat strip cable 22 has a loop 28. The flat strip cable 22 subsequently abuts the outer wall 12 of the rotor before finally terminating in the free end 26. When the rotor 12 is rotated relative to the stator 14, the loop 28 moves about the axis of rotation 30 of the rotor in the space 16.

Three elastically resilient annular bands 32 are provided in the space to support the flat strip cable 22.

Figure 3:
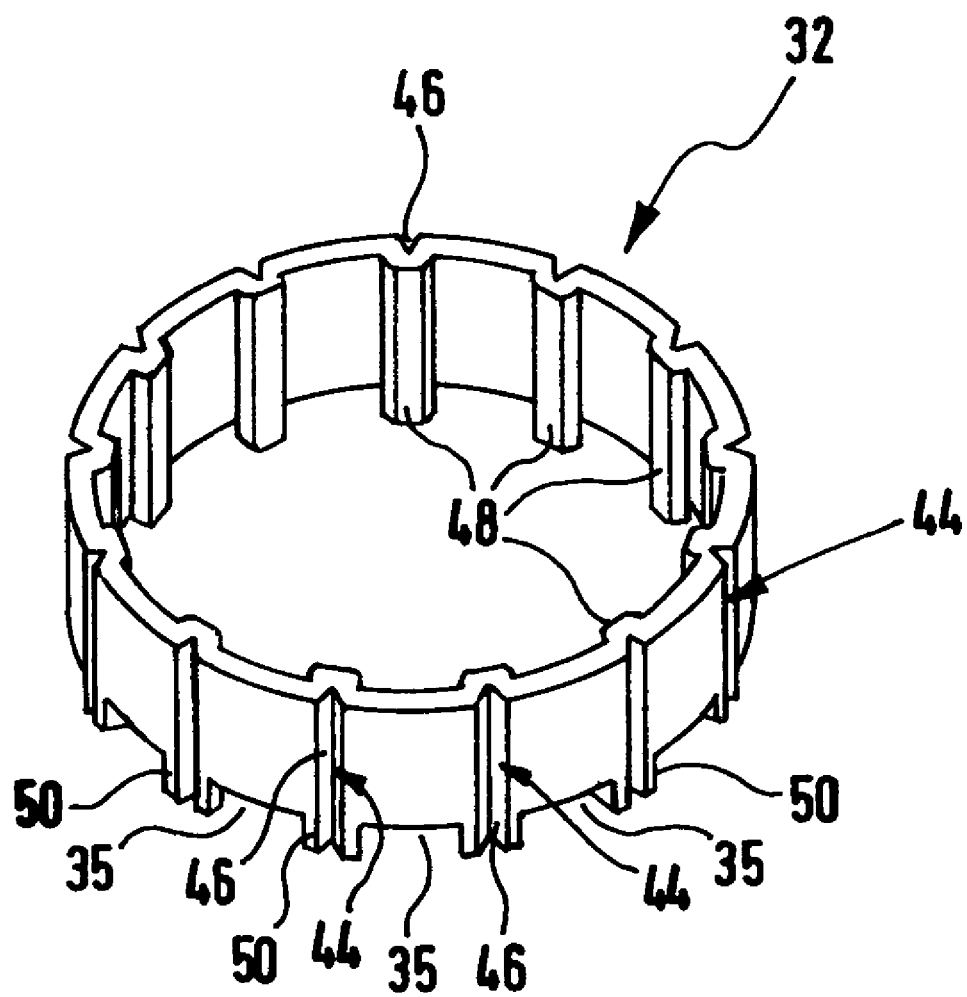
FIG. 3 shows an annular band of a transmission device in accordance with FIGS. 1 and 2.

As is shown in FIG. 3, the annular bands 32 are largely circular in the disassembled state. In the assembled state, the annular bands 32 are located in the space 16 and have a kidney or cucumber-shaped contour. Due to their elasticity, the annular bands act against the outer wall 18 of the rotor and the inner wall 20 of the stator 14. The flat strip cable 22 which is supported on both the outer wall 18 and also the inner wall 20 is reliably pressed towards the inner wall 14 and outer wall 18 in the space 16.

To ensure reliable rolling of the annular bands 32 on the outer wall 18 and inner wall 20, the annular bands have engagement sections 34 on their side facing the bottom 36 of the space 16, via which the annular bands 32 can be driven by the rotor 12 and the stator 14. Slipping or undesired blockage of rolling of the annular bands 32 in the space 16 are thereby avoided as well as mutual impairment of the annular bands 32 during rotation of the rotor 12.

The rotor 12 and the stator 14 have tooth-like drive sections 38, 39 for engagement in the engagement sections 34, which are disposed in the region of the bottom 36 of the space 16 and cooperate with tooth-gap-like recesses 35 of the engagement sections 34.

The tooth-like drive sections 38 of the stator 14 are disposed on the bottom 36 of the space and extend from the inner wall 20 into the space. The tooth-like drive sections 39 on the rotor side also extend along the bottom 36 from the rotor 12 into the space. The tooth-like, stator-side drive sections 38 are uniformly distributed on the bottom 36 over the entire periphery of the inner wall 20. The rotor-side drive sections 39 are correspondingly uniformly distributed over the entire outer wall 18 of the rotor in the region of the bottom 36. A gap 52 is provided between neighboring tooth-like drive sections 38, 39, wherein the annular band side teeth 50 disposed between two recesses 35 engage into the gaps 52. The tooth-like drive sections 38, 39 engage in the side recesses 35 on the annular band.

The individual drive sections 38, 39 each extend in a radial direction (perpendicularly to the axis of rotation 30) and also in an axial direction (parallel to the axis of rotation 30). Due to their axial design, the drive sections 38, 39 engage in the recesses 35 of the engagement sections 34. The radial extension of the drive sections 38 permits support of the free edge of the flat strip cable 22 facing the bottom 36 on the drive sections 38, 39. This minimizes friction of the flat strip cable 22 on the bottom 36.

As is shown in particular in FIG. 2, the individual drive sections 38, 39 have a substantially cuboid main part 40 and an adjacent end part 42 which extends in a radial direction and tapers down towards the bottom. Tapering of the end part 42 towards the bottom 36 ensures that the flat strip cable 22 is safely supported on the main parts 40 of the individual drive sections 38, 39.

To improve their elasticity, the annular bands 32 have deformation indentations 44 which extend substantially parallel to the axis of rotation 30. The deformation indentations 44 are thereby formed by a groove 46 having a substantially semi-circular cross-section. Since the annular bands 32 have a substantially constant thickness, the sides opposite the grooves 46 have bulges 48.

As is clearly shown e.g. in FIGS. 1 and 3, one tooth 50 extends in the longitudinal direction of each deformation indentation 44, wherein two teeth 50 delimit one tooth-gap-like recess 35. In the assembled state, the teeth 50 project between a gap formed by two neighboring tooth-like drive sections.

The individual annular bands 32 are disposed in the space 16 with a mutual distribution such that two neighboring annular bands 32 cannot contact. The engagement sections 34 on the annular bands 32 and the associated drive sections 38, 39 on the stator and on the rotor which cooperate with the engagement sections 34 ensure that the annular bands are safely driven in the space 16, substantially without play and with no slippage. The elasticity of the annular bands 36 moreover prevents any undesired noise on the stator and on the rotor.

We claim:

1. A device for transmitting electrical signals, the device comprising:
    a rotor;
    a stator, said rotor and said stator being disposed relative to each other to define a substantially annular space between them;
    a flat strip cable disposed in said annular space, said flat strip cable cooperating with said rotor and said stator to transmit the electrical signals between said rotor and said stator, said flat strip cable being structured to wind and unwind within said annular space; and
    an elastically resilient annular band, said annular band disposed in said space to support said flat strip cable, said annular band having engagement sections on a side thereof, said engagement sections cooperating with said stator and/or said rotor to drive said annular band, wherein said engagement sections are disposed on an upper and/or lower edge of said annular band and are formed as tooth-gap-like recesses which cooperate with complementary tooth-like drive sections of said rotor and/or of said stator to drive said annular band.

2. The device of claim 1, further comprising several annular bands disposed in said space, wherein respective neighboring annular bands do not contact each other.

3. An annular band as claimed in the device of claim 1.

4. The device of claim 1, wherein said annular band has deformation indentations which extend substantially parallel to an axis of rotation of said rotor for caterpillar-like rolling of said annular band in said space.

5. The device of claim 4, wherein a tooth extends in a longitudinal direction of each of said deformation indentations to delimit each of said tooth-gap-like recess of said engagement sections.

6. The device of claim 1, wherein said drive sections of said rotor and/or said stator are disposed on or proximate to a bottom of said space.

7. The device of claim 6, wherein said drive sections extend in an axial and radial direction to support a free edge of said flat strip cable.

8. The device of claim 7, wherein each of said drive sections comprises a substantially cuboid main part and an end part which faces said space in a radial direction and which tapers towards said bottom of said space.

* * * * *